United States Patent Office 3,272,738
Patented Sept. 13, 1966

3,272,738
PROCESS FOR THE REMOVAL OF METAL CORROSION PRODUCTS FROM A SOLUTION OF HYDRAZINE AND ETHYLENEDIAMINETETRAACETIC ACID
Edgar C. Pitzer and George R. Fountain, Scotia, and Joseph R. Ciaranello, De Witt, N.Y., assignors to the United States of America as represented by the United States Atomic Energy Commission
No Drawing. Filed June 17, 1964, Ser. No. 375,983
1 Claim. (Cl. 210—51)

The invention described herein was made in the course of, or under, a contract with the U.S. Atomic Energy Commission.

This invention relates to a process for the removal of metal corrosion products from solutions of complexing agents. More particularly, this invention relates to a method of precipitating the iron, nickel, cobalt, and managanese present in a solution of ammonium citrate or a solution of hydrazine and ethylenediaminetetraacetic acid. The process according to this invention may be employed as a step subsequent to the removal of metal corrosion products with a solution of hydrazine and ethylenediaminetetraacetic acid (EDTA), which is disclosed in the copending application Serial No. 375, 985 filed June 17, 1964, entitled, "Neutral Metal Cleaning Composition."

Prior to the present invention, several methods were used for concentrating solutions containing metal corrosion products into a smaller and more convenient volume. Evaporation and ion exchange were among the numerous processes previously employed. All of these process operations had inherent drawbacks which were magnified when certain dangerous materials had to be handled. Dangerous materials which were particularly troublesome were radioactive contaminated products which permitted only limited or remote handling.

Some of the more successful prior art cleaning compositions and processes used an equeous solution of sodium hydroxide and potossium permanaganate, or an aqueous solution of ammonium citrate. These solutions were generally applied consecutively with intervening flushings and the liquids were passed through an ion exchange column to remove the undesirable metal ions.

It has now been discovered that a simple and less cumbersome process will give improved removal of metal corrosion products by precipitation with an alkali ferrocyanide.

Accordingly, it is the primary object of this invention to provide a process for the removal of metal corrosion products from corrosion solvent solutions.

Another object of the present invention is to provide a process for the removal of iron, cobalt, nickel, and manganese ions from solutions of complexing agents.

Other and further objects will become apparent to those skilled in the art from the following description and examples.

The removal of the metal corrosion products from a complex containing aqueous cleaning solution, according to this invention, may be accomplished by the addition of an aqueous solution of an alkali metal ferrocyanide, preferably potassium ferrocyanide, to the cleaning solution containing the corrosion products. A precipitate forms upon the addition of the ferrocyanide and may be removed by any of the several methods known in the art, such as centrifugation or filtration. A portion of the supernatant solution may then be withdrawn and tested to determine whether precipitation is complete or whether further addition of the ferrocyanide is required to effect complete removal of the corrosion products.

In a more detailed description, an aqueous solution containing a complexing agent which will dissolve metal corrosion products is applied to the metal surface to be cleaned in any appropriate manner. Although the present invention may be applied to any metal cleaning composition, a solution which has been determined to be particularly well suited is a solution containing hydrazine and ethylenediaminetetraacetic acid.

These solutions are effective in dissolving certain metal corrosion products, particularly, oxides of iron, nickel, cobalt, and manganese. After the solution has been applied, it becomes laden with the corrosion product and must be either discarded or regenerated by removing the corrosion products. Inasmuch as some of the ingredients in the cleaning solution are expensive, the regeneration of the cleaning solution by a simple, fairly inexpensive method is a more attractive alternative from an economic standpoint.

A number of precipitants common in the prior art were tried, but were ineffective. The usual precipitants such as hydroxides, carbonates, and phosphates, when added to the cleaning solutions, failed to break the stable complexing agent and precipitate the metal corrosion products. The addition of potassium ferrocyanide solution was found to be relatively inexpensive and provided a fairly economical and successful means of removing the corrosion products.

Addition of potassium ferrocyanide solution to the cleaning solution which has been acidified to a pH of from 1.0 to 5.0 will result in extensive precipitation of the metal corrosion products. Precipitation of the corrosion products has been found to be at least 99% complete when the citrate solution was acidified to a pH range of 2 to 5 or when the hydrazine and EDTA solution was acidified to a pH of from 1.1 to 1.5.

The completeness of this method of removal is attractive, particularly when the corrosion products are radioactive and handling and disposal would be harmful to personnel. The removal of 99% of the corrosion products would reduce contamination of the cleaning solution to the point that it could be handled or discarded with safety.

The following examples will serve to illustrate the completeness with which the present process can remove metal corrosion products from aqueous solutions containing a complexing agent.

*Example I*

Two solutions containing sulfates of iron, nickel, and cobalt in a concentration of 0.12 molar were prepared in 1.2 molar diammonium citrate. One solution was acidified using a 4 molar solution of sulfuric acid to a pH of 2 and the other solution was acidified to a pH of 5. Prior to precipitation each of the two solutions contained 55.8 mg. of iron, 58.7 mg. of nickel, and 58.9 mg. of cobalt.

A solution of 0.2 molar potassium ferrocyanide was added to the solutions until extensive precipitation occurred. The precipitate was allowed to settle and a portion of the clear supernatant liquid from each sample solution was withdrawn. The supernatant liquids were tested on a spot plate with a drop of uranyl acetate. The potassium ferrocyanide solution was added in incremental amounts to the samples until the spot test showed a brown coloration upon the addition of the uranyl acetate, and a 10 mole percent excess of the potassium ferrocyanide was then added to sample solutions. Addition of potassium ferrocyanide which is 10% in excess of the stoichiometric amount is recommended to insure complete precipitation of the metals.

The samples were centrifuged until the precipitates were compact, and the clear supernatant liquids and precipitates were separated by withdrawing the liquids.

An analysis of both clear supernatant liquids revealed less than 0.5 mg. of each of the metals present.

Essentially no distinction existed between the amount of metal in the two solutions. The solution having the pH of 2 contained the same amount of unprecipitated metal as did the solution with a pH of 5.

tation and testing procedure was substantially the same as described in Example I.

The results of the tests are set forth in the following table:

ACTIVITY OF SUPERNATANT SOLUTION

| Experiment No. | 1 | 2 | 3 | 4 | 5 | 6 | 7 |
|---|---|---|---|---|---|---|---|
| Ml. of spike* | 5 | 1 | 1 | 1 | 1 | 1 | 1. |
| Total volume | 25 | 50 | 50 | 50 | 50 | 50 | 68. |
| Carrier | None | Ni 0.03 M | Co 0.03 M | Fe, Ni, Co 0.01 M ea. | Co, Mn 0.02 M ea. | Zn 0.1 M | Fe, Co, 0.01 M each 0.1 g. $Na_2S_2O_4$. |
| EDTA Concentration | 0.05 M | 0.05 M | 0.05 M | 0.05 M | 0.07 M | 0.15 M | 0.04 M. |
| Gross $\beta c./min./ml$ | 1 | 1 | 1 | 1 | 1 | 1 | 1. |
| Apparent Decontamination Factor | $6 \times 10^4$ | $6 \times 10^4$ | $6 \times 10^4$ | $6 \times 10^4$ | $6 \times 10^4$ | $6 \times 10^4$ | $6 \times 10^4$. |
| Gross $\gamma c./min./ml$ | | $4.5 \times 10^5$ | $1.1 \times 10^5$ | $6.2 \times 10^4$ | | | |
| Apparent Decontamination Factor | | 32 | 128 | 220 | | | |
| $Co^{60}\ \mu c./ml$ | 0.23 | 0.2 | 0.05 | 0.03 | 0.037 | 0.03 | 0.03. |
| Apparent Decontamination Factor | 245 | 28 | 114 | 190 | 151 | 190 | 143. |
| $Mn^{54}\ \mu c./ml$ | 0.028 | 0.004 | 0.009 | 0.003 | 0.007 | 0.003 | 0.001 |
| Apparent Decontamination Factor | 24 | 17 | 8 | 24 | 10 | 24 | 50. |

*Dose rate from 1 ml. of spike solution at a distance of 2 inches: 200 mr./hr. initially. 1 mr./hr. after ferrocyanide precipitation.

Example II

Several twenty milliliter sample solutions containing 0.08 mole of iron, 0.01 mole of nickel, 0.01 mole of cobalt and 1 ml. of 1 molar ammonium ethylenediaminetetraacetic acid were prepared and acidified to a pH in the range of 1.1 to 1.5. The EDTA concentration in the solution before addition of the potassium ferrocyanide solution was approximately 0.09 molar and after precipitation it was approximately 0.06 molar. The same procedure of periodic spot testing the supernatant liquid with uranyl acetate and adding 10% excess of the ferrocyanide solution after the spot indicates a brown coloration, which was used in Example I was again employed here.

The metal concentrations remaining in the clear supernatant liquids were determined by X-ray fluorescence spectrography. The analysis indicated that approximately 1% by weight iron, less than 1% by weight of nickel and approximately 0.2% by weight of cobalt remained dissolved in the supernatant liquid.

Other tests were performed to determine what effect an increased concentration of EDTA would have upon removal of the dissolved metal contaminants.

In those tests of the EDTA concentration was increased to 0.16 molar before precipitation of the metals by the ferrocyanide solution. The results were substantially the same.

Example III

In order to determine the applicability of the present invention to the decontamination of a cleaning solution containing radioactive corrosion products, a series of tests were conducted in which a radioactive spike was placed in ethylenediaminetetraacetic acid solutions containing nickel, cobalt, iron, manganese, or zinc metal carriers. The radioactive spike which was added to the EDTA solution contained $Co^{60}$ and $Mn^{54}$ which had readings of 286 microcuries/milliliter and 3.4 microcuries/milliliter, respectively. The radiation intensity produced by the spike was $3 \times 10^6$ curies/minute/milliliter of beta radiation and $7 \times 10^8$ curies/minute/milliliter of gamma radiation.

The solutions were acidified to a pH of 1.2 by the addition 4 molar sulfuric acid. The subsequent precipi- A wide range of concentrations of the solutions may be used in the practice of this invention with the primary considerations being the regulations of the pH of the solution in a range in which the chelate can be broken by the ferrocyanide ion and the convenience of handling the resulting volumes. Generally, at least a stoichiometric amount of the ferrocyanide ion is necessary for complete precipitation, with another 10 mole percent added to insure complete reaction.

When this invention is applied to large volumes of materials, small measured portions, e.g., a few milliliters, are withdrawn from the storage vessel and tested as described in the preceding examples. After the precipitate has been centrifuged, the amounts of the materials may be scaled up by simple proportions to accommodate the larger volume.

The above description and examples are intended for purposes of illustration, only, and are not intended to be limiting. It will be apparent to those skilled in the art that numerous variations may be effected within the scope of the invention.

We claim:

A process for the removal of metal corrosion products from a solution of hydrazine and ethylenediaminetetraacetic acid comprising acidifying a solution of hydrazine and ethylenediaminetetraacetic acid containing corrosion products from the group consisting of iron, nickel, cobalt, and manganese to a pH in the range of 1.0 to 1.5 by the addition of sulfuric acid, adding a solution of potassium ferrocyanide in an excess of 10 mole percent of the stoichiometric amount of said corrosion products to said hydrazine and ethylenediaminetetraacetic acid solution whereupon a precipitate is formed, centrifuging the precipitate containing solution and separating the clear hydrazine and ethylenediaminetetraacetic acid solution from the precipitate.

References Cited by the Examiner
UNITED STATES PATENTS

| | | | |
|---|---|---|---|
| 1,354,940 | 10/1920 | Bachman | 23—77 X |
| 2,996,449 | 8/1961 | Hodge et al. | 210—58 |
| 3,033,214 | 5/1962 | Bersworth et al. | 134—13 |
| 3,116,240 | 12/1963 | Downey et al. | 210—38 X |

MORRIS O. WOLK, *Primary Examiner.*

MICHAEL E. ROGERS, *Examiner.*

UNITED STATES PATENT OFFICE
CERTIFICATE OF CORRECTION

Patent No. 3,272,738                        September 13, 1966

Edgar C. Pitzer et al.

It is hereby certified that error appears in the above numbered patent requiring correction and that the said Letters Patent should read as corrected below.

Column 1, line 40, for "potossium" read -- potassium --; column 3, line 29, in the footnote to the table, before "1 mr./hr." insert -- Less than --; same column 3, lines 71 and 72, for "curies", each occurrence, read -- microcuries --.

Signed and sealed this 29th day of August 1967.

(SEAL)
Attest:

ERNEST W. SWIDER
Attesting Officer

EDWARD J. BRENNER
Commissioner of Patents